United States Patent [19]

Sakai

[11] 4,443,199

[45] Apr. 17, 1984

[54] METHOD OF TEACHING THE PRONOUNCIATION AND SPELLING AND DISTINGUISHING BETWEEN THE WRITTEN AND SPOKEN FORM OF ANY LANGUAGE

[76] Inventor: Margaret Sakai, 8 Loddon Ct., Clayton South, Victoria 3169, Australia

[21] Appl. No.: 379,473

[22] Filed: May 18, 1982

[51] Int. Cl.³ ............................................. G09B 1/32
[52] U.S. Cl. .................................................. 434/170
[58] Field of Search .......................... 434/170, 167, 178

[56] References Cited

U.S. PATENT DOCUMENTS

| | | | |
|---|---|---|---|
| 1,732,980 | 10/1929 | Mooney | 434/170 |
| 3,426,451 | 2/1969 | Hoffmann | 434/178 |
| 3,464,124 | 9/1969 | Lynd | 434/170 |
| 3,654,712 | 4/1972 | Bagdasar | 434/170 |
| 3,715,812 | 2/1973 | Novak | 434/170 |
| 4,115,932 | 9/1978 | Charlesworth | 434/167 |
| 4,262,431 | 4/1981 | Darnell | 434/170 |

FOREIGN PATENT DOCUMENTS

| | | |
|---|---|---|
| 284223 | 3/1966 | Australia . |
| 169621 | 10/1921 | United Kingdom . |
| 653255 | 5/1951 | United Kingdom . |
| 1192883 | 5/1970 | United Kingdom . |
| 1547824 | 6/1979 | United Kingdom . |

*Primary Examiner*—William H. Grieb
*Attorney, Agent, or Firm*—DePaoli & O'Brien

[57] ABSTRACT

A method of teaching the pronounciation and spelling and distinguishing between the written and spoken form of any language utilizes three sets of flat tiles which are: a first set of uncolored black and white tiles with small letters, capitals and double letters, all on separate tiles; a second set of tiles, each having an individually and distinctively colored blank surface on one side to represent a different phonetic vowel sound and also colors to represent differences in spelling, the reverse side of each colored tile having a phonetic symbol for the sound of the color on the other side surface; and a third set of tiles having, printed thereon, single letter consonants and two letter digraph combinations of consonants with a single phonetic sound. There is a fourth set of tiles of special geometric shapes for particular consonants and digraphs, while a fifth set of neutral-colored black or white tiles represents silent or unpronounced letters in a formed work. The individually, distinctively colored, and specially shaped and neutral-colored tiles and neutral tiles can be placed alongside alphabetic tiles, or alongside two consonant or double consonant digraph tiles into the word letter spaces in order to indicate correct spelling and pronouncing of words.

24 Claims, 2 Drawing Figures

METHOD OF TEACHING THE PRONOUNCIATION AND SPELLING AND DISTINGUISHING BETWEEN THE WRITTEN AND SPOKEN FORM OF ANY LANGUAGE

BACKGROUND OF THE INVENTION

1. Field of the Invention

This invention relates to a method and a teaching aid system for teaching the spelling and pronunciation of any language.

2. Description of the Prior Art

The majority of written and spoken languages comprise series of words that are made up of a combination of letters of an alphabet. There is however a problem in learning the language in that the letters of the alphabet are pronounced quite differently depending upon their use in combination. The combination of letters of the alphabet, including certain single uses of letters, are phonetically characterized and with a majority of languages the students must not only know the written script of the language but must know how to pronounce the language in its phonological form.

There are a number of systems for teaching languages and in particular the English language, which incorporates the use of both alphabetical notations and phonological methodologies, i.e. it relates to phonetics. One such system for itemizing and selecting various combinations of linguistic sound units to assist students in a particular language to effectively read and pronounce is the International Phonetic Alphabet I.P.A. Another system is the Daniel Jones English Pronunciation System, which incorporates phonemes, i.e. a minimum significant sound unit, comprising vowels and consonants.

When students and particularly young children learn to read and write a language, there is a problem of identifying the phonological characteristics of the language in a manner that the child can readily single out from the alphabetical notations of the language the phonetical pronunciation. Letters of the alphabet are fairly distinctive and have such common usage that it does not take long for a child or student to learn to recognize each letter. However, the pronunciation within the variations of the alphabetical transcriptions is not so easily conceivable and has no common representation which a child would readily comprehend when learning to read or pronounce. This fusion of the phonetical pronunciation and alphabetical transcriptions which becomes a difficulty and problem for the learner to cognitively develop his linguistic abilities to read and pronounce readily can be broken down by this invention, which uses a teaching aid as a device to draw out the embedded phonetic pronunciation of the language from its alphabetical notations dividing the phonetic pronunciation and the alphabetical notations clearly into two distinguishable and identifiable components: The phonological form and the written form. Previous systems have been developed, but are limited for use with the English language. Thus U.S. Pat. No. 4,115,932 discloses phonetics system for the English language including a plurality of tiles for learning the sounds of English words by associating vowels associated with the sounds of vowels alone, vowels in diagraphs, vowels in diphthongs, vowels in vowel/consonant combinations, vowels in vowel combinations and vowels in vowel patterns with colors that identify each of these vowel sounds as they commonly occur in English words.

U.S. Pat. No. 3,426,351 discloses a font of English of alphabetical letters for teaching of spelling; each letter of the font has the shape of the standard letter of the alphabet to which it corresponds and shading is used to suggest its pronunciation. Underlines and dots are also used for additional pronunciation characteristics, such as dipthongs and digraphs. U.S. Pat. No. 3,715,812 discloses, as a phonic dictionary, a book having a color coded symbol system comprising a non-displaceable English alphabet letters applicable only to the English language for different language sounds, as such letters have in different words for pronunciation, reading and learning of such English language words. U.S. Pat. No. 1,732,980 discloses an educational device for teaching spelling, but not pronunciation and which comprises a plurality of cards all of uniform shape with a letter of the alphabet printed on each card, consonant letter cards being printed in one color and vowel letter cards being printed in colors which are different from each other and from the consonant letter color.

SUMMARY OF THE INVENTION

This invention relates generally to a teaching method and aid for teaching the pronunciation and spelling of any language by using displaceable units which differentiate the written form and spoken form of a language into clear and identifiable components by extracting from the written form of the language its phonological characteristics while simultaneously unifying coherently the pronunciation of the various written scripts of the one phonetic sound.

The method of teaching the pronunciation and spelling of any language according to the invention comprises:

using a first set of displaceable units with display surfaces thereon which individually, prominently carry an alphabet letter indicia selected from the letters of the alphabet of the language, using a second set of displaceable units some of which have individual means on the surface thereof which enable identification of a phonetic vowel indicia of the language, the others of said displaceable units being individually formed into different shapes to represent indicia selected from specific phonetic consonants and digraphs of the language, selecting the first and second sets to be distinct and teaching pronunciation and spelling of words of the language by interposing the alphabet units and the phonetic units.

The first set of displaceable units visually or tangibly, individually, prominently, carry alphabet letters of the language and the second set of displaceable units has some which are individually coloured to indicate a phonetic vowel of the language and others which are formed into different geometric shapes to represent specific consonants and diagraphs of the language.

DESCRIPTION OF THE PREFERRED EMBODIMENT

In one embodiment of the present invention, three sets of small rectangular or square tiles are provided. The tiles are preferably of wood, plastic or metal and may incorporate on the inner face thereof a magnetic device so that the tiles may be magnetically secured to a vertical display board. A first set of twenty six tiles are used to represent the upper case and lower case of the twenty six letters of the Roman Alphabet and each tile prominantly displays each letter of the alphabet.

Figure 1:
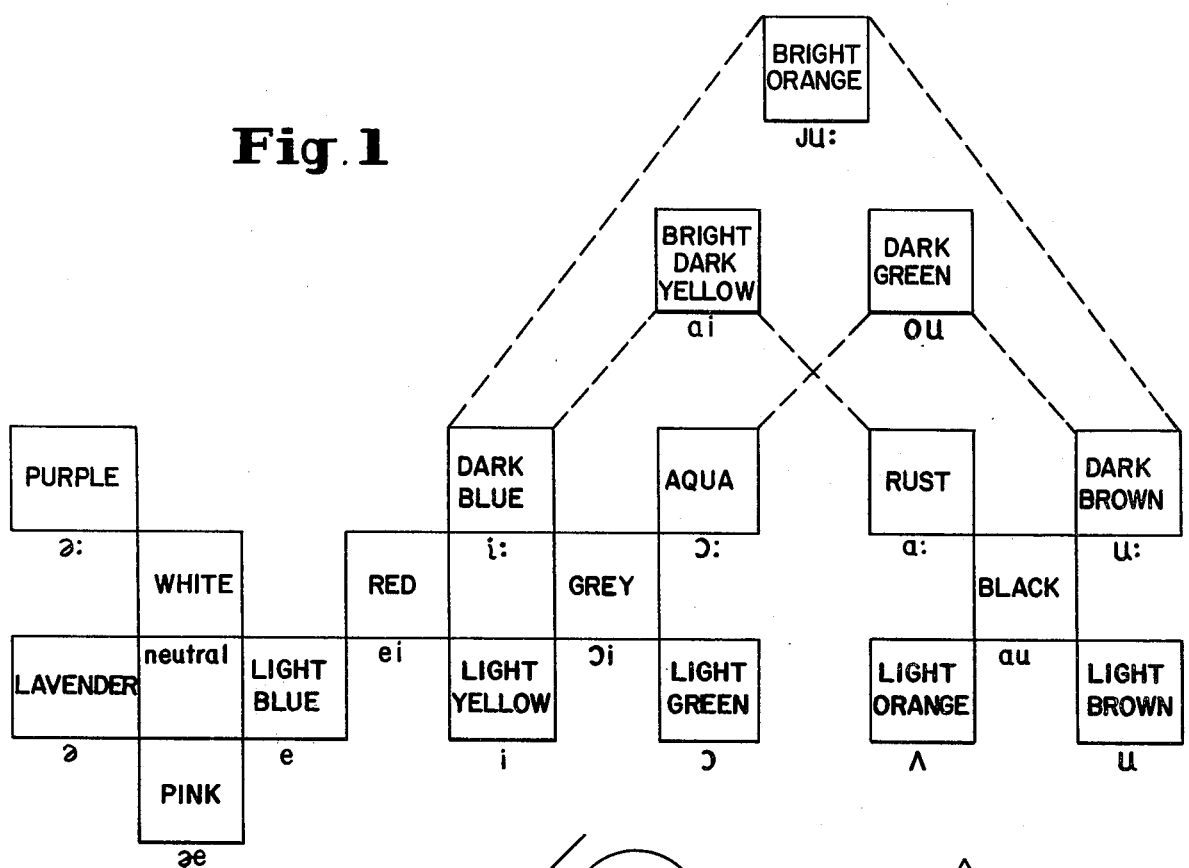
FIG. 1 is an illustration of tiles representing the phonetic vowels.
Figure 2:
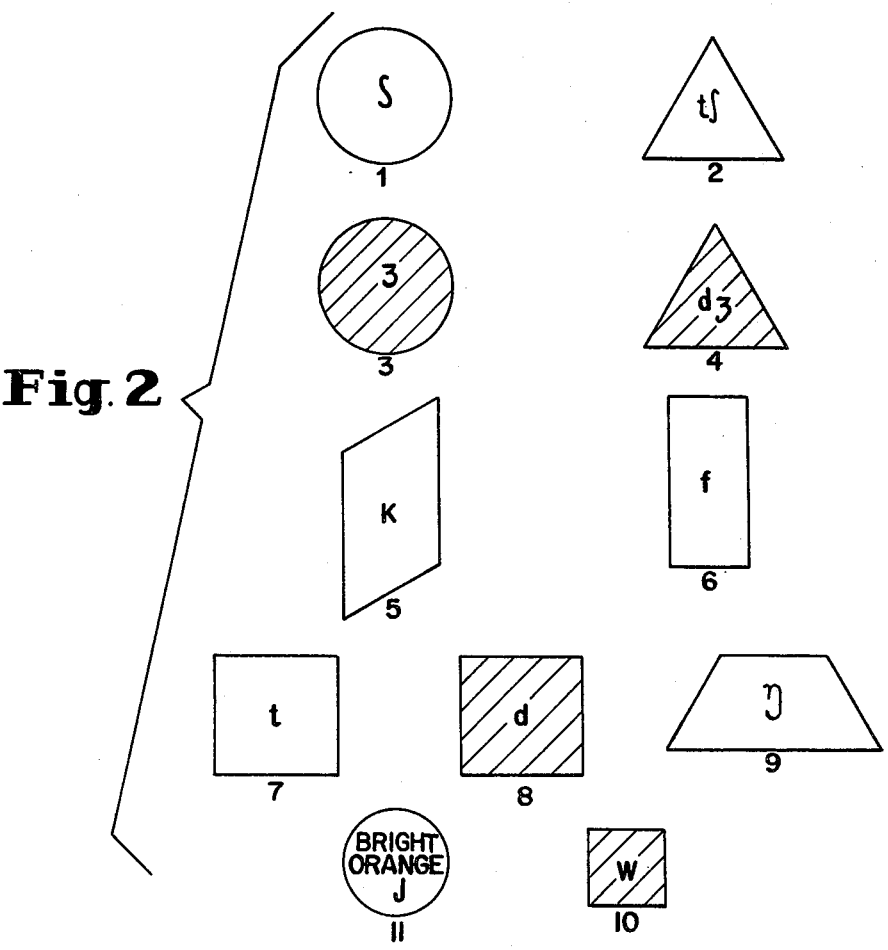
FIG. 2 is a structured illustration of a possible variation in shapes of tiles for use representing different phonetic consonants and digraph.

In FIG. 1, a second set of rectangular or square tiles of similar design are used to represent the phonetic vowels that is the eleven long vowels, seven short vowels and one neutral vowel. A different colour is used for each tile so the student, by recognizing the colour, can distinguish one phonetic vowel from the other. The designated phonetic vowels in application to Daniel Jones phonetic notations are: seven shot vowels:/æ, e, i, ɔ, Λ, u, ə/eleven long vowels: /a:, ɔ:, i:, ɔ:, u:, ei, ai, ɔi, ou, au, ju:/. One side of the tiles would carry the symbol, whilst the other side of the tile would carry the coloured surface so that the teacher and/or student can simply utilize a vowel sound by selecting a particular colour. The selection of colours may vary according to particular preferences of the user of the kit, full-tone colours being used for the long vowels, the half-tone colours being used for the short vowels, as shown in FIG. 1. In FIG. 2, other phonetic symbols of consonants are represented by the third set of tiles which are of a different shape to the previous two sets and may or may not incorporate a variation in colours.

In the preferred embodiment, different shapes are used for each of the specified consonants illustrated in the accompanying drawings, see FIG. 2, and also in application to the Daniel Jones phonetic notations, the designated phonetic consonants are: six voiceless consonants: /tʃ,ʃ, f, k, t,ʧ/three voiceless consonants: /d3,3 d/, two semi-vowels: /w, j/.

The use of individual tiles act as a unifying element of the various spelling forms of the one phonetic sound to assist students in recognizing each of the phonetic vowels and consonants by concentrating on the colours and/or shapes of the sets of tiles. The use of the coloured tiles and separately shaped tiles assists both the teacher and student in readily recognizing particular phonetic symbols in the similar manner as that of the tiles of the alphabet are recognizable by their distinctive form, so in use, the kit can be utilized to illustrate word or combination of words of a language by combining the letters of the alphabet and the phonetic symbols and by interchanging the letters of the alphabet with the phonetic symbols. The kit can be utilized to demonstrate the difference between the written form and spoken form of a language. The kit can also demonstrate readily how the various combination of letters of the alphabet have entirely different pronunciations by the use of the distinctive tiles representing the phonetic symbols.

To further illustrate the use of the kit described above, reference is made to the following example in which the phonetic vowels are represented as follows:

Accordingly, the phonetic vowel /ei/ as in the word "day" may be represented by the alphabet letter "d" which is phonetically pronounced as /d/ and the red tile representing the phonetic sound /ei/ together with a white tile or neutral tile which kit used to indicate the existence of a letter, but, which is not pronounced:

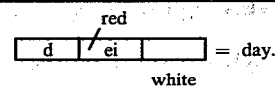

Similarly, the word "maid" could be formed of the alphabet letter "m" which is phonetically pronounced /m/, the red tile, a white tile and the letter "d" phonetically pronounced /d/:

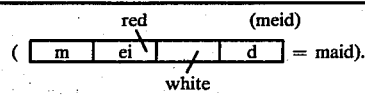

The phonetic vowel /i:/ as in the word "meet" could be represented by the letter "m" or phonetically /m/. a dark blue tile, a white tile and the letter "t" or /t/:

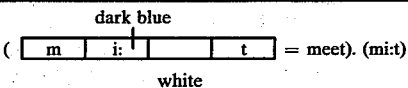

In contrast the word "police" would comprise a combination of the letter 'p'=/p/, a light purple tile=/ju/, the letter 'l'=/l/, a dark blue tile=/i:/, the letter 's'=/s/ and a white tile which, although it is not pronounced, does indicate that a letter exists: (p li:s)

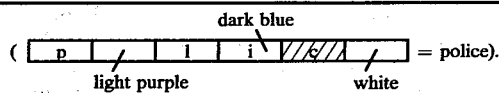

As a further example the word "use" would be represented by a bright orange tile representing /ju/, the letter 's'=/s/ and the white tile which can represent any letter which is not pronounced:

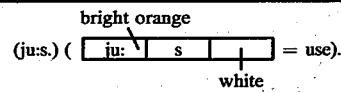

whilst the word "new" would be represented by the letter 'n'=/n/ and again the bright orange tile 'ju' with the white tile:

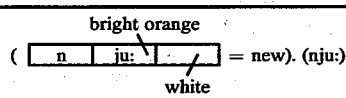

It can be seen that by varying the use of the phonetic tiles and the letters of the alphabet and replacing the various forms of spelling the one phonetic vowel unit of the alphabet by phonetic tiles, the phonological characteristics can be distinguished from the alphabetical notations of the written script of the language and the otherwise fusion of the written form and spoken form is quite distinct from each other, thus, therefore, demonstrating to the student that they can readily determine the phonological characteristics from the writtten formula when learning a language.

In FIG. 2, various tiles representing digraphs are illustrated and numbered one to eleven. As a further illustration, examples of the phonetic consonants are listed below:

| | | |
|---|---|---|
| 1. | ʃ | shop |
| 2. | tʃ | chair |
| 3. | ʒ | pleasure |
| 4. | dʒ | page |
| 5. | k | back |
| 6. | f | phone |
| 7. | t | laughed |
| 8. | d | rained |
| 9. | ŋ | thing |
| 10. | w | suade |
| | | semi-vowels |
| 11. | j | behaviour |

Of the kit, that is the three sets of tiles, one set to illustrate the alphabet, the second set the phonetic vowels and the third set the phonetic consonants, other displaceable units may be used, such as objects as puppets instead of tiles or cartoon illustrations instead of the alphabet or any other conceivable form which readily assists the students in their ability to develop their spoken and written skills of a language.

Such examples of use would be in the area of primary teaching, remedial work, second language learning, speech therapy, braille, linguistics, and other areas of this nature and where the kit can be applied.

It is therefore understood that many variations or modifications fall within the scope of the present invention and the present invention is not restricted to the use of the tile, or any particular range of colours, sizes, shapes, and dimensions.

As a teacher's aid, it is understood that the use of the blocks, cards or tiles may be the appropriate form to represent the alphabet and phonetic symbols. It is further understood that any combination of phonetic symbols may be used and that the invention is not restricted to the Daniel Jones system. Furthermore, the choice of displaceable units of tiles used in the embodiment is entirely arbitrary and can be varied to suit the particular group of students and the choice of colours and/or other representations on the tiles are also arbitrary and can be varied to suit the particular group of students.

It is understood that the system can be used to teach any language, including languages which use a combination of the alphabet and phonetic symbols, such as the Romanized Japanese language.

It is further envisaged that this invention may be incoporated into any keyboard system, such as that of a typewriter or a solid state electronic circuitry, so that the user can simply feed in a signal, for example, via keyboard to produce the printout or digital printout that is interposed interjected by the displaceable units of the alphabet and phonetic symbols which effectively serve the purpose of the displaceable tiles.

In other forms of the invention, the tiles may be provided with specially profiled symbols which can be touched by blind people, so that they can readily differentiate the phonology from the written script to assist their efficiency in reading.

Other modifications and variations include the use of the displaceable units in the form of tiles or cards to reflect the intonation, punctuation stress, syllabry and other detailed features of a language. It is also envisaged that this kit could be incorporated in a form to teach local dialects and inflexions for assistance in elocution.

The testing kit for this English language example is devised for the Roman alphabet and comprises:

a. The upper and lower case of the Roman alphabet
b. Phonetic vowels of designated colours
c. Consonants and digraphs of the designated shapes and designs.
d. Charts and manuals are at present being compiled The number of units per kit is based on the frequency of occurance of approximately a 25–30 word reading passage. Two or more kits can be combined for extended usage in build-up and follow-up work.

The units are magnetized to adhere to a board for display and on the inner facing of the units there may be placed, if necessary, the representation of its phonetic symbol per colour, shape and design of the specified vowels, consonants and di-graphs. This is to assist in phonetic recognition, although the charts are also for this purpose.

The units are devised to move freely and independently of each other to alternate in combination to form words, sentences, or to be singled out individually from the other units.

The displaceable units, in functioning as a visual focal point for pronunciation of the various written forms of the one phonetic sound would assist students, in one aspect, to learn English as a second or foreign language. For example, the letter "a"/ei/ as in words "make"-/meik/, "day", /dei/, "maid"/meid/ or "a" also pronounced /ae/ as in words "apple"/aepl/, "plait"/plaet/ have been mispronounced when not being previously taught, although the students were familiar with the basic pronunciation of the Roman alphabet of the English language. The unit /ei/ is designated red and /ae/ is the colour pink.

The displaceable units would function as in the following examples:

| white red | white red | white red | white red |
|---|---|---|---|
| m k | d | m d | t* |
| m a k e | d a y | m a i d | e i g h t** |
| /m<u>ei</u>k/ | /d<u>ei</u>/ | /m<u>ei</u>d/ | /<u>ei</u>t/*** |

*[displaceable units]
**[spelling variation]
***[phonetic symbols]

The white unit, although it can be omitted, indicates "silent" letters of a word, but adds to the formation of the word. Similarly, the other designated phonetic symbols, shown in FIG. 1 and FIG. 2, function in the same way.

Unlike migrant children who have problems in pronunciation/comprehension, young primary children also find the pronunciation of the various written words difficult to pronounce correctly, despite being familiar with the words orally and aurally. However, with the aid, the scripted forms would be easily pronounced simply by automatically recognizing the colours, signs and designs of the displacing units. Build-up and follow-up can be developed by combining the kits and programmed in print with one page the pronounced form and the other page its written form, or both placed on the one page in combination.

Inversely, the aid can be itilized to assist children in the transitional stages of their learning ability to spell. This function, by way of colour and pattern formation as in the example below, applies to the commonly occuring spelling forms:

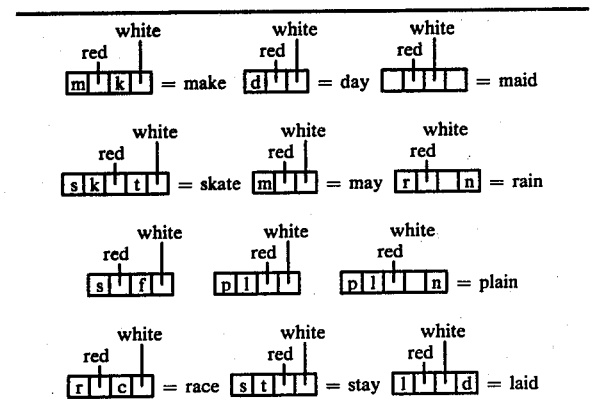

Sentence structures for drills on pronunciation can be built

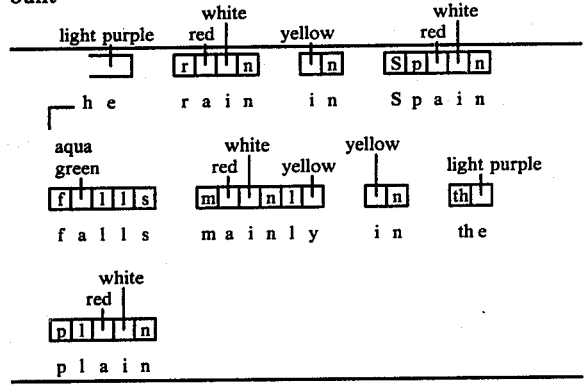

Grammatical syntax can be visually patterned in a similar way progressively building up from an elementary stage to an advanced stage.

The examples below are indications of application in languages other than English: /a:/ designated the colour rust.

| Language | Display Units | Roman Form | Engl. Equiv. | Phonetic Symbol |
|---|---|---|---|---|
| English | [white] c / rust | car | car | /ka:/ |
| Chinese | [t] rust | ta | he | /ta:/ |
| French | [white] t b l / rust | table | table | /ta:bl/ |
| Japanese | [aqua green] / rust | ato | after | /a:to:/ |
| Spanish | [aqua green] r b l / rust | arbol | tree | /a:rbo.l/ |

With the mobility and independecy of each unit, the words can be divided into syllables. Other such linguistic applications of a language as stress, intonation, rhythm and so on can also be clearly indicated and emphasised.

There are many other examples where the displaceable units can be applied, but, most importantly, the kit of the present invention gives a student the opportunity to gain at will, autonomously and independently, the pursuit of his interests in any language regardless of dialect or accents of that language.

I claim:

1. A method of teaching the pronounciation and spelling and distinguishing between the written and spoken form of any language, the method comprising: A. utilizing three sets of tiles which consist essentially of: (1) a first set denoting alphabet letters, (2) a second set denoting phonetic vowels, (3) a third set denoting phonetic consonants, said first set comprising all geometrically uniform tiles, each said geometrically uniform tile having an alphabet letter on one surface thereof in black or white and a background of opposite white or black colour to the letter colours, there being a separate tile for each upper case alphabet letter and a separate tile for each lower case alphabet letter, said second set of tiles comprising geometrically uniform tiles wherein one surface of each tile is blank and is individually and distinctively coloured to represent a phonetic vowel spelling where there are differences in spelling the same vowel sound, while the other surface of each tile contains a phonetic symbol to represent the vowel sound of said one surface, the said third set of tiles comprising single letter consonants and two-letter digraph combinations of consonants having a single phonetic sound: B. selecting the first, second and third sets to be distinct, and C. teaching the pronounciation and spelling of words of said any language by interposing said alphabet tiles and said phonetic tiles.

2. The method of claim 1, wherein said third set of tiles includes tiles which are individually formed into different geometric shapes to represent indicia selected from specific phonetic consonants and digraphs of said any language.

3. The method of claim 1, comprising teaching both the pronunciation and spelling of the language by interposing tiles of said second set between tiles of said first set to represent both the alphabetical spelling of the word and any combination of the alphabet letters and the vowels of the word.

4. The method of claim 1, wherein said second set of tiles has some units which are individually coloured to indicate a phonetic vowel of any language and additional, individually coloured alphabet pieces for nonstandard alphabet sounds.

5. The method of claim 4, wherein additional coloured alphabet pieces are provided for sound variations of the same consonant letter.

6. The method of claim 1, wherein displaceable units are provided in individually distinct colours to represent variations in vowel sounds of particular combinations of letters according to spelling combinations.

7. The method of claim 1, wherein an additional set of blank, neutral-coloured pieces are provided to represent any unpronounced silent letter in a word and each blank, neutral-coloured piece is used by placing it alongside spelling and pronounciation units of both the first and second sets of displaceable tiles.

8. The method of claim 7, wherein each blank, neutral-coloured piece is a white displaceable tile.

9. A method of teaching the pronounciation and spelling and distinguishing between the written and spoken form of any language, the method comprising utilizing three sets of tiles, the first set denoting alphabet letters, the second set denoting phonetic vowels, the third set denoting phonetic consonants, the first set comprising all geometrically uniform tiles, each tile having an alphabet letter on one surface thereof, in black or white, and a background of opposite white or black colour to the letter colours, there being separate tiles for each upper case alphabet letter and separate tiles for each lower case alphabet letter, the second set of tiles comprising geometrically uniform tiles wherein one surface of each tile is blank and individually and distinctively coloured to represent a phonetic vowel sound and vowel spelling where there are differences in spelling the same vowel sound, while the other surface of each tile contains an individual International Phonetic Alphabet Symbol to represent the vowel sound on said one surface, the second set of tiles also including tiles individually distinctively coloured to represent single letter vowel sounds and tiles individually distinctively coloured to represent double letter vowel sounds, the third set of tiles comprising single letter consonants and two letter digraphs of two-letter combinations of consonants having a single phonetic sound, selecting the first, second and third sets to be distinct, and teaching how to distinguish between pronounciation and spelling of words of the language by interposing the alphabet tiles and the phonetic tiles.

10. The method of claim 9, wherein said third set of tiles includes tiles which are individually formed into different geometric shapes to represent indicia selected from specific phonetic consonants and digraphs of the language.

11. The method of claim 9, comprising teaching both the pronounciation and spelling of said any language by interposing tiles of said second set between tiles of said first set to represent both the alphabetical spelling of a word and any combination of the alphabet letters and the vowels of said word.

12. The method of claim 9, wherein said second set of displaceable tiles has some tiles which are individually coloured to indicate a phonetic vowel of said any language and additional, individually coloured alphabet pieces are provided for non-standard alphabet sounds.

13. The method of claim 12, wherein said additional coloured alphabet pieces are provided for sound variations of the same consonant letter.

14. A teaching for teaching aid the pronounciation and spelling and distinguishing between the written and spoken form of any language, comprising three sets of tiles, the first set denoting alphabet letters, the second set denoting phonetic vowels, the third set denoting phonetic consonants, the first set comprising all geometrically uniform tiles, each tile having an alphabet letter on one surface thereof in black or white and a background of opposite white or black colour to the letter colours, there being separate tiles for each upper case alphabet letter and separate tiles for each alphabet lower case letter, the second set of tiles comprising geometrically uniform tiles wherein one surface of each tile is blank and individually and distinctively coloured to represent a phonetic vowel sound and vowel spelling where there are differences in spelling the same vowel sound, while the other surface of each tile contains a phonetic symbol to represent the vowel sound of the first said surface, the third set of tiles comprising single letter consonants and two-letter digraph combinations of consonants having a single phonetic sound.

15. The teaching aid of claim 14, wherein the third set of tiles includes tiles which are individually formed into different geometric shapes to represent indicia selected from specific phonetic consonants and digraphs of the language.

16. The teaching aid of claim 14, wherein the second set of displaceable tiles has some tiles which are individually coloured to indicate a phonetic vowel of any language and additional, individually coloured alphabet tiles are provided for non-standard alphabet sounds.

17. The teaching aid of claim 16, wherein the additional coloured alphabet tiles are provided for sound variations of the same consonant letter.

18. The teaching aid of claim 17, wherein displaceable tiles are provided in individually distinct colours to represent variations in vowel sounds of particular combinations of letters according to spelling combinations.

19. The teaching aid of claim 18, wherein an additional set of blank, neutral-coloured tiles are provided to represent any unpronounced silent letter in a word and each blank, neutral-coloured tile is used by placing it alongside spelling and pronounciation tiles of both the first and second sets of displaceable tiles.

20. The teaching aid of claim 19, wherein each blank, neutral-coloured piece is a white displaceable tile.

21. A teaching aid for teaching for teaching the pronounciation and spelling and distinguishing between the written and spoken form of any language, comprising three sets of tiles, the first set denoting alphabet letters, the second set denoting phonetic vowels, the third set denoting phonetic consonants, the first set comprising all geometrically uniform tiles, each tile having an alphabet letter on one surface thereof, in black or white and a background of opposite white or black colour to the letter colours, there being separate tiles for each upper case alphabet letter and separate tiles for each alphabet lower case letter, the second set of tiles comprising geometrically uniform tiles wherein, one surface of each tile is blank and individually and distinctively coloured to represent a phonetic vowel sound and vowel spelling where there are differences in spelling the same vowel sound, while the other surface of each tile contains an individual International Phonetic Alphabet Symbol to represent the vowel sound on the first said surface, the second set of tiles also including tiles which are individually and distinctively coloured to represent single letter vowel sounds and tiles which are individually and distinctively coloured to represent double letter vowel sounds, the third set of tiles comprising single letter consonants and two letter digraphs of two-letter combinations of consonants having a single phonetic sound.

22. The teaching aid of claim 20, wherein the third set of tiles includes tiles which are individually formed into different geometric shapes to represent indicia selected from specific phonetic consonants and digraphs of the language.

23. The teaching aid of claim 21, wherein the second set of displaceable tiles has some tiles which are individually coloured to indicate a phonetic vowel of any language and additional individually coloured alphabet tiles are provided for non-standard alphabet sounds.

24. The teaching aid of claim 23, wherein the additional coloured laphabet tiles are provided for sound vairations of the same consonant letter.

* * * * *